United States Patent
Chang et al.

(10) Patent No.: US 7,347,610 B2
(45) Date of Patent: Mar. 25, 2008

(54) LIGHT GUIDE PLATE HAVING LIGHT DIFFUSING ENTITIES ON LIGHT ENTERING SIDE

(75) Inventors: Chia-Yin Chang, Fengshan (TW);
Kuan-Ling Tseng, Fengshan (TW);
Kuan-Tun Chen, Yunlin Hsien (TW);
Wen-Lung Liu, Kaohsiung (TW);
Yung-Jen Chen, Fengshan (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 264 days.

(21) Appl. No.: 11/042,133

(22) Filed: Jan. 26, 2005

(65) Prior Publication Data

US 2006/0164863 A1   Jul. 27, 2006

(51) Int. Cl.
*F21V 7/04* (2006.01)
*F21V 5/02* (2006.01)
*G02B 6/00* (2006.01)

(52) U.S. Cl. .................. 362/621; 362/620; 362/628; 362/622

(58) Field of Classification Search .......... 362/622, 362/628, 612, 555, 558, 620
See application file for complete search history.

(56) References Cited

U.S. PATENT DOCUMENTS

| | | | | |
|---|---|---|---|---|
| 3,040,168 A | * | 6/1962 | Stearns | 362/628 |
| 5,727,862 A | * | 3/1998 | Wu | 362/612 |
| 6,065,845 A | * | 5/2000 | Miyazaki | 362/612 |
| 6,601,962 B1 | * | 8/2003 | Ehara et al. | 362/612 |
| 6,935,764 B2 | * | 8/2005 | Choi et al. | 362/612 |
| 2004/0130912 A1 | * | 7/2004 | Miyashita | 362/561 |
| 2005/0030730 A1 | * | 2/2005 | Ohkawa et al. | 362/626 |
| 2005/0105282 A1 | * | 5/2005 | Yu et al. | 362/620 |
| 2005/0243575 A1 | * | 11/2005 | Kunimochi | 362/620 |
| 2005/0254258 A1 | * | 11/2005 | Lee | 362/612 |
| 2006/0072339 A1 | * | 4/2006 | Li et al. | 362/612 |

FOREIGN PATENT DOCUMENTS

JP   406051130   * 2/1994

* cited by examiner

*Primary Examiner*—Jong-Suk (James) Lee
*Assistant Examiner*—Ismael Negron
(74) *Attorney, Agent, or Firm*—Leonq C. Lei (57) ABSTRACT

A light guide plate has a light exiting side, a reflection side opposite to the light exiting side, and a light entering side. A plurality of miniature diffusing entities, each having a curved surface and two slant surfaces extending from the two ends of the curved surface, are formed on the light entering side. The combination of the curved surface and the two slant surfaces cause light emitted from point-like light sources to have wider incident angles and be uniformly scattered into the light guide plate.

3 Claims, 12 Drawing Sheets

LIGHT GUIDE PLATE HAVING LIGHT DIFFUSING ENTITIES ON LIGHT ENTERING SIDE

BACKGROUND OF THE INVENTION (a) Technical Field of the Invention

The present invention generally relates to light guide plates of TFT-LCDs, and more particularly to light guide plates that can uniformly scatter lights from point light sources by widening the lights' incident angles.

(b) Description of the Prior Art

Figure 1:
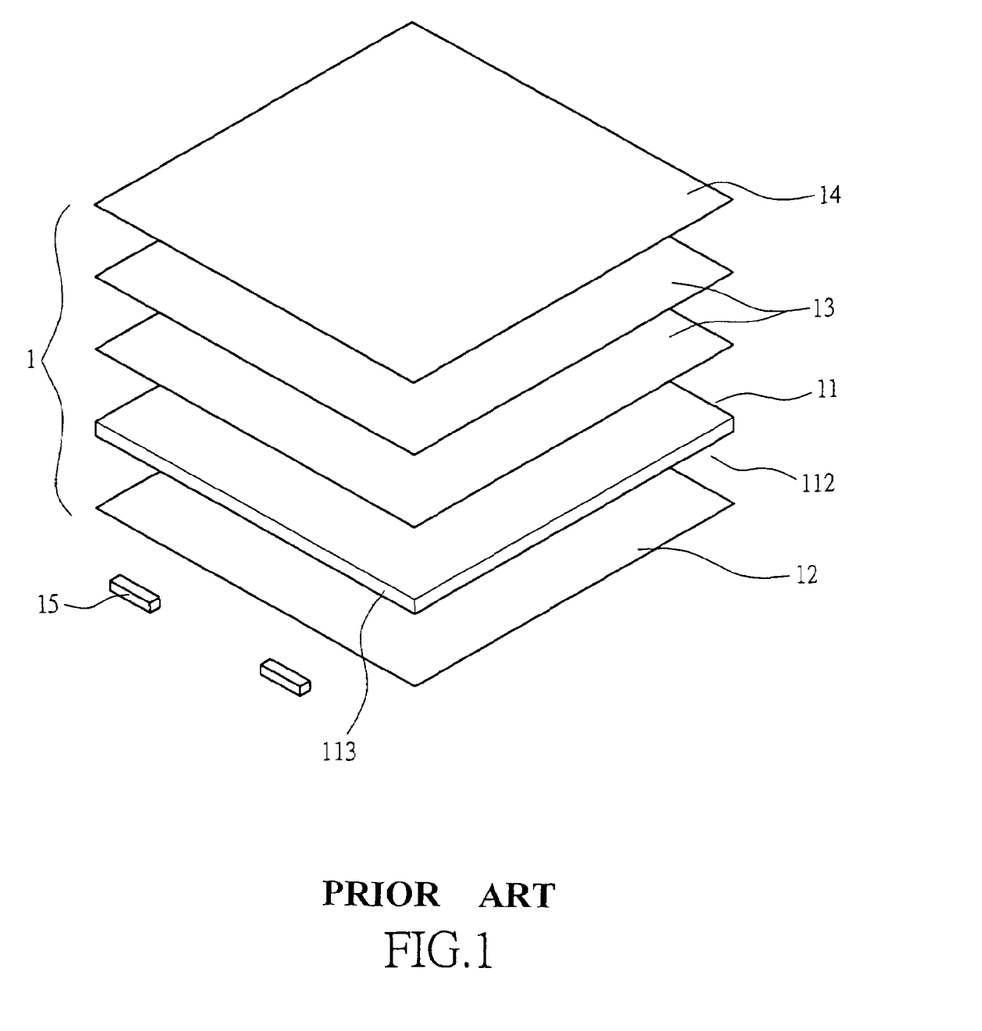
FIG. 1 is a perspective explosion view of a conventional planar light source.

A typical planar light source found in a TFT-LCD, as shown in FIG. 1, mainly includes a light guide plate 11, a reflection plate 12, a number of diffusion films 13 and prism sheets 14, and lamps 15. As one of the most important components of the planar light source 1, the light guide plate 11 receives, transmits, and redirects lights emitted from the lamps 15.

Figure 2:
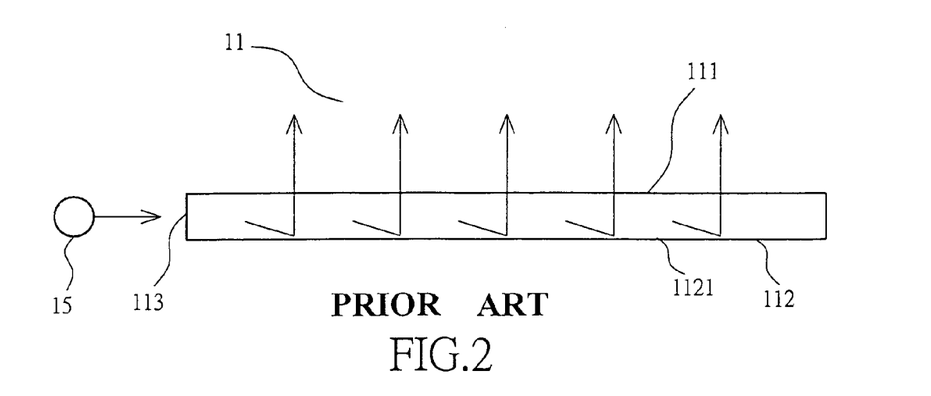
FIG. 2 is a schematic side view of a conventional light guide plate showing trajectories of lights.

As shown in FIG. 2, the light guide plate 11 is usually of a rectangular shape, having a light exiting side 111, a reflection side 112 opposite to the light exiting side 111, and at least a light entering side 113 at the flank. The lights emitted from the lamps 15 enter into the light guide plate 11 via the light entering side 113, of which a portion directly leaves the light guide plate 11 via the light exiting side 111, and the other portion lands on the reflection side 112. The reflection side 112, therefore, is configured with numerous dots 1121 on the surface and the dots 1121 have increasingly higher distribution density or larger surface area as they are located farther away from the lamps 15, so as to reflect light as much as possible to the fight exiting side 111.

Figure 3:
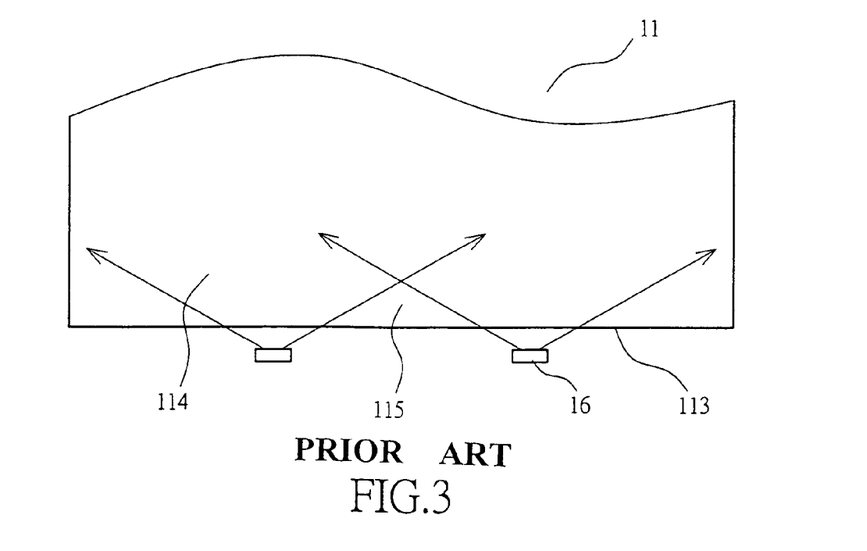
FIG. 3 is a schematic top view of a conventional light guide plate showing trajectories of lights from pint light sources.

Usually, cold cathode fluorescent lamps (CCFLs) or light-emitting diodes (LEDs) are used as the lamps 15 for the planar light source 1. The application of CCFLs is simpler, as they are linear light sources. On the other hand, the application of LEDs is more complicated as they are point light sources. As shown in FIG. 3, the lights emitted from the LEDs 16 would have an incident angle when entering the light guide plate 111 via the light entering side 113. There are, therefore, bright zones 114 and dark zones 115 formed inside the light guide plate 11, depending on whether they are within the coverage of the incident light. Although adding more LEDs 16 could eliminate dark zones 115, this is not a satisfactory approach as the additional LEDs 16 increase material cost, power consumption, assembly complexity, and the possibility of future malfunctioning.

Figure 4:
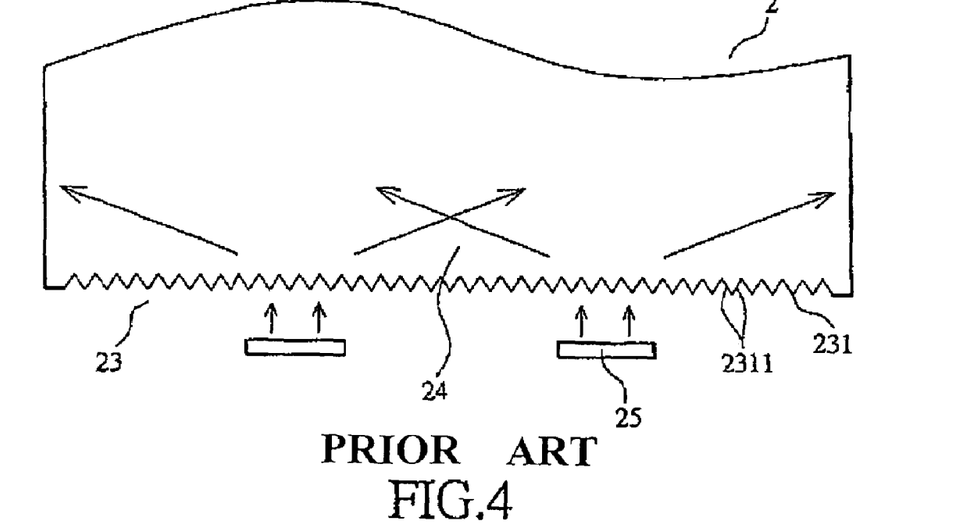
FIG. 4 is a schematic top view of another conventional light guide plate showing trajectories of lights from pint light sources.
Figure 5:
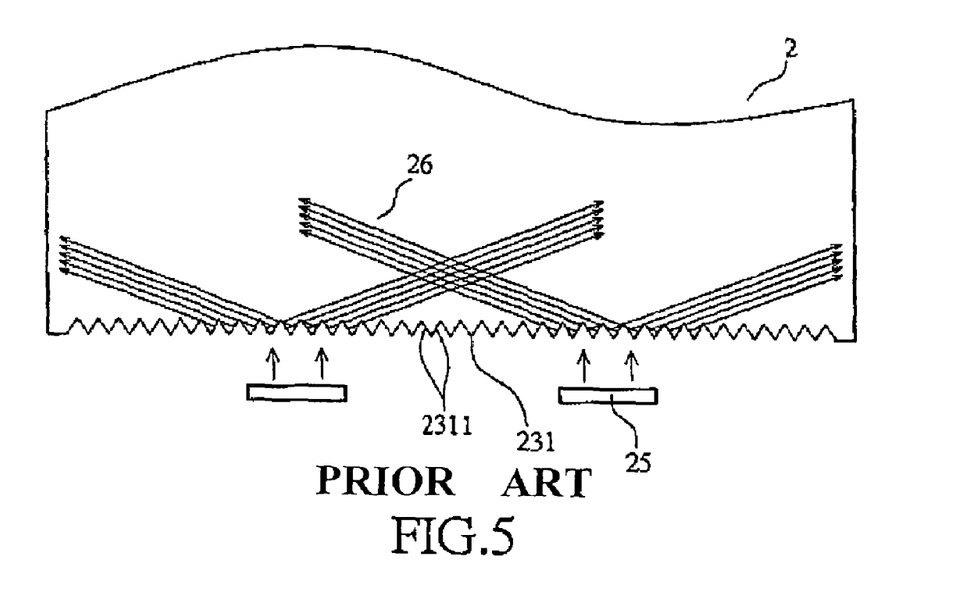
FIG. 5 is another schematic top view of the light guide plate depicted in FIG. 4.

Another approach has been proposed for eliminating dark zones. As shown in FIG. 4, the light guide plate 2 has a fight exiting side 21, a reflection side 22 opposite to the light exiting side 21, and at least a light entering side 23 at the flank. The fight entering side 23 is configured to have a plurality of saw-toothed diffusing entities 231. The lights emitted from the LEDs 25, when passing through the slant surfaces 2311 of the diffusing entities 231, are scattered to have larger incident angles. The dark zones 24 inside the light guide plate 2 are thereby reduced. However the approach has its own problem. As shown in FIG. 5, when lights emitted form the LEDs 25 passes thought the diffusing entities 231, they are refracted by the two slant surfaces 2311 of each diffusing entity 231 and some of them would have aligned traveling direction. These aligned refracted lights would add to each other to form brighter lights 26, resulting in non-uniform lighting of the light guide plate 2. This phenomenon would limit the subsequent application of the light guide plate 2 and is not consistent with the uniform lighting requirement of the light guide plate 2.

SUMMARY OF THE INVENTION

The primary purpose of the present invention is to provide a light guide plate that can uniformly scatter lights from point light sources. The light guide plate of the present invention forms diffusing entities on the light entering side of the light guide plate, so that lights emitted form the light sources could have wider incident angles and could uniformly scatter into the light guide plate.

To achieve the objective of the present invention, each of the diffusing entities formed on the light entering side of the light guide plate has a curved surface and two slant surfaces. The curved surface causes the lights from the light sources to undergo multiple-angled refractions in both left and right directions.

In addition, the two slant surfaces cause the lights from the light sources to undergo fixed-angled refraction in both left and right directions.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

In the following, detailed description along with the accompanied drawings is given to better explain preferred embodiments of the present invention. Please note that some parts in the accompanied drawings are not drawn to scale or are somewhat exaggerated. It should be understood that this is for illustrative purpose, and is not intended to limit the present invention in any way.

Figure 6:
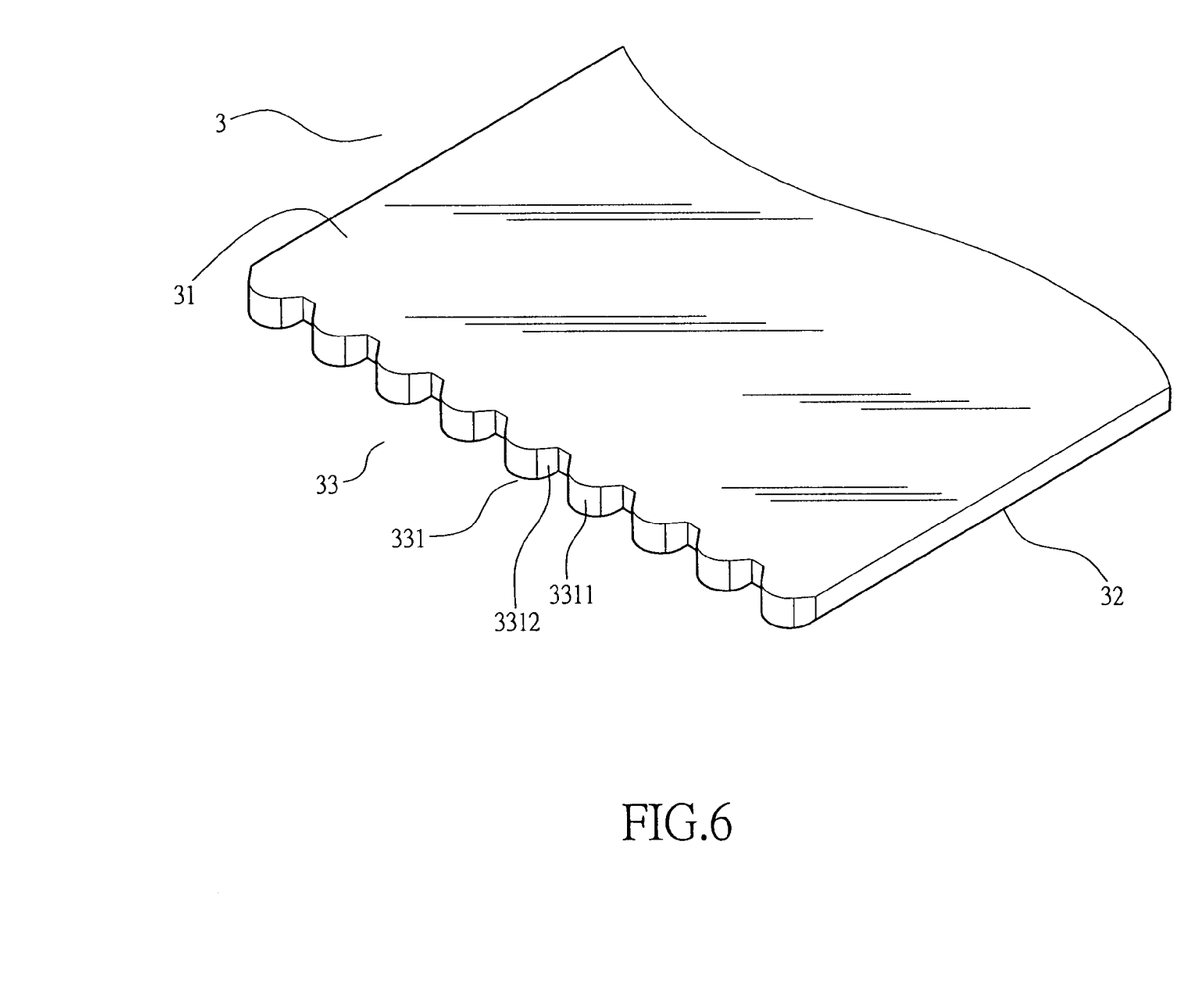
FIG. 6 is a perspective view of a light guide plate according to an embodiment of the present invention.

Please refer to FIG. 6. As shown in FIG. 6, the light guide plate 3 is a transparent board. The light guide plate 3 has a light exiting side 31, a reflection side 32 opposite to the light exiting side 31, and at least a light entering side 33.

The light exiting side 31 is where the lights form the light sources (not shown) are delivered. The reflection side 32 is configured to have multiple dots (not shown) for reflecting lights emitted from the light sources to pass through the light exiting side 31. The lights emitted from the light sources enter and travel inside the light guide plate 3 via the light entering side 33. Please note that the light entering side 33 is configured to have multiple miniature diffusing entities 331. Each of the diffusing entities 331 has a curved surface 3311 and two slant surfaces 3312 are extended from the two ends of the curved surface 3311 to the light entering side 33.

Figure 7:
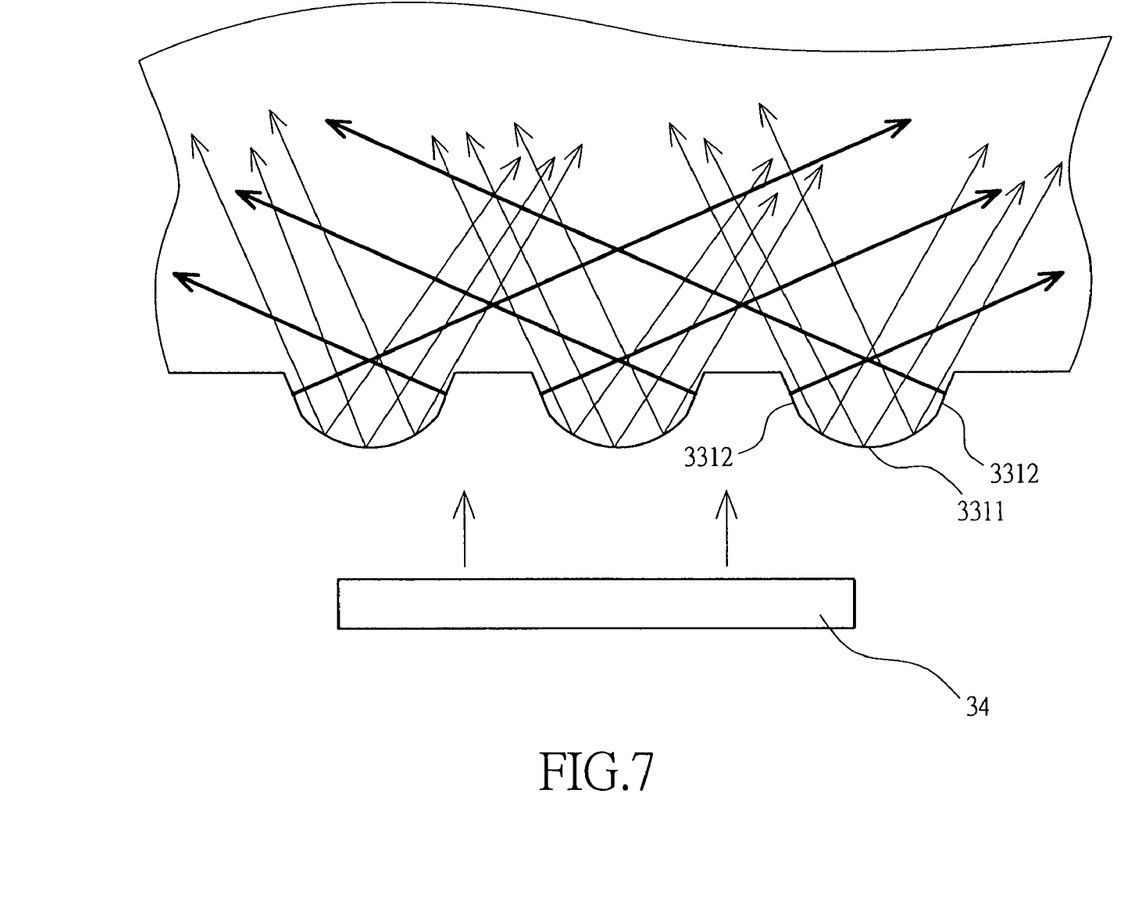
FIG. 7 is an enlarged schematic top view of a light guide plate according to an embodiment of the present invention showing trajectories of lights.

Please refer to FIG. 7. As shown in FIG. 7, the lights emitted from the light sources (LEDs 34), when passing through the curved surfaces 3311 of the diffusing entities 331, would be refracted in various angles. On the other hand, the two slant surfaces 3312 produces fixed-angled refraction to both left and right sides of the incident lights. The fixed-angled refracted lights would, therefore, blended with the multiple-angled refracted lights so that the non-uniform lighting found in prior arts is avoided. In other words, the diffusing entities 331 according to the present invention could not only widen the incident angles of the lights from point light sources but also could avoid the non-uniformed lighting resulted from fixed-angled refraction.

As shown in FIG. 7, on the light entering side 33, there are small gaps between adjacent diffusing entities 331. To further increase the scattering effect, the diffusing entities 331 could be continuously arranged with no gaps left therebetween, as shown in FIG. 8.

Figure 8:
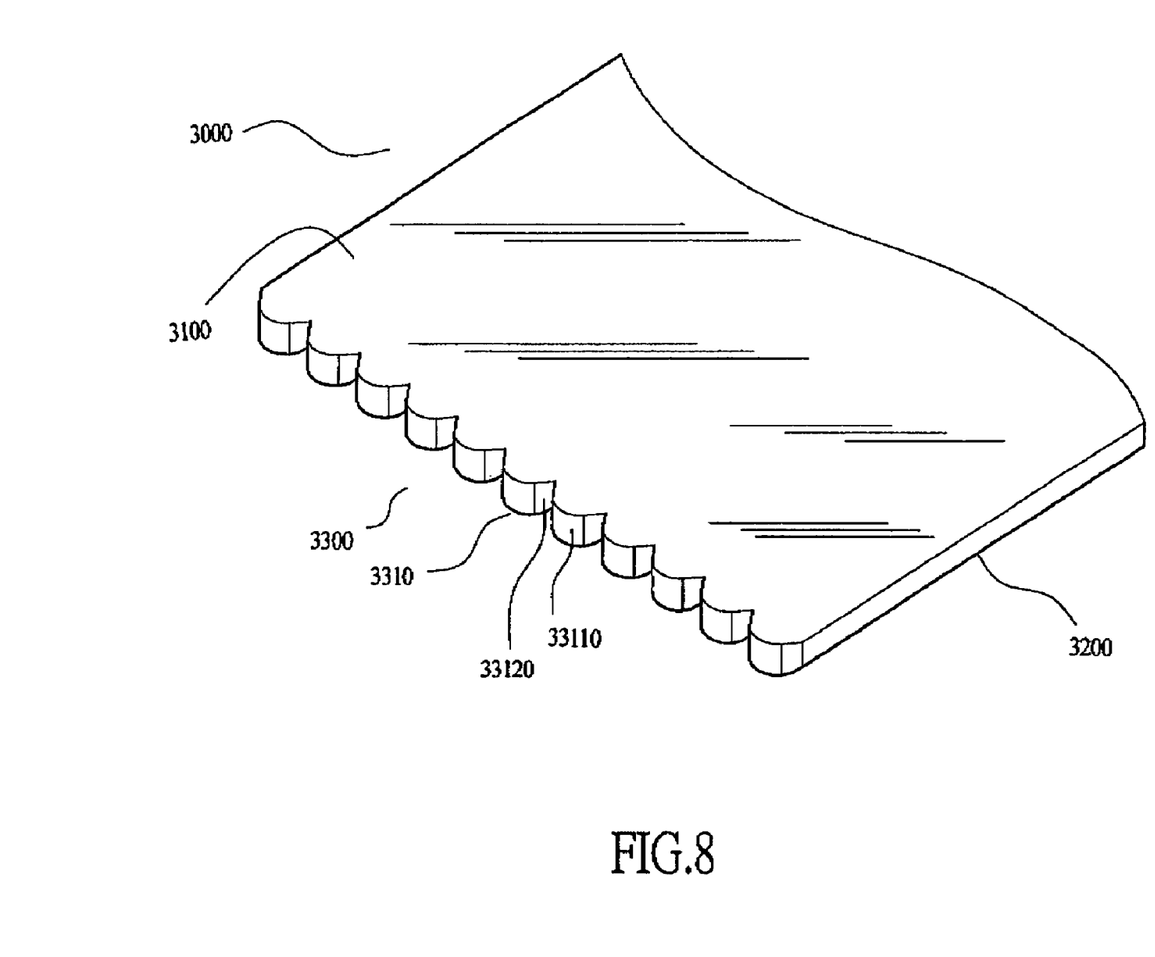
FIG. 8 is a perspective view of a light guide plate according to a second embodiment of the present invention.
Figure 9:
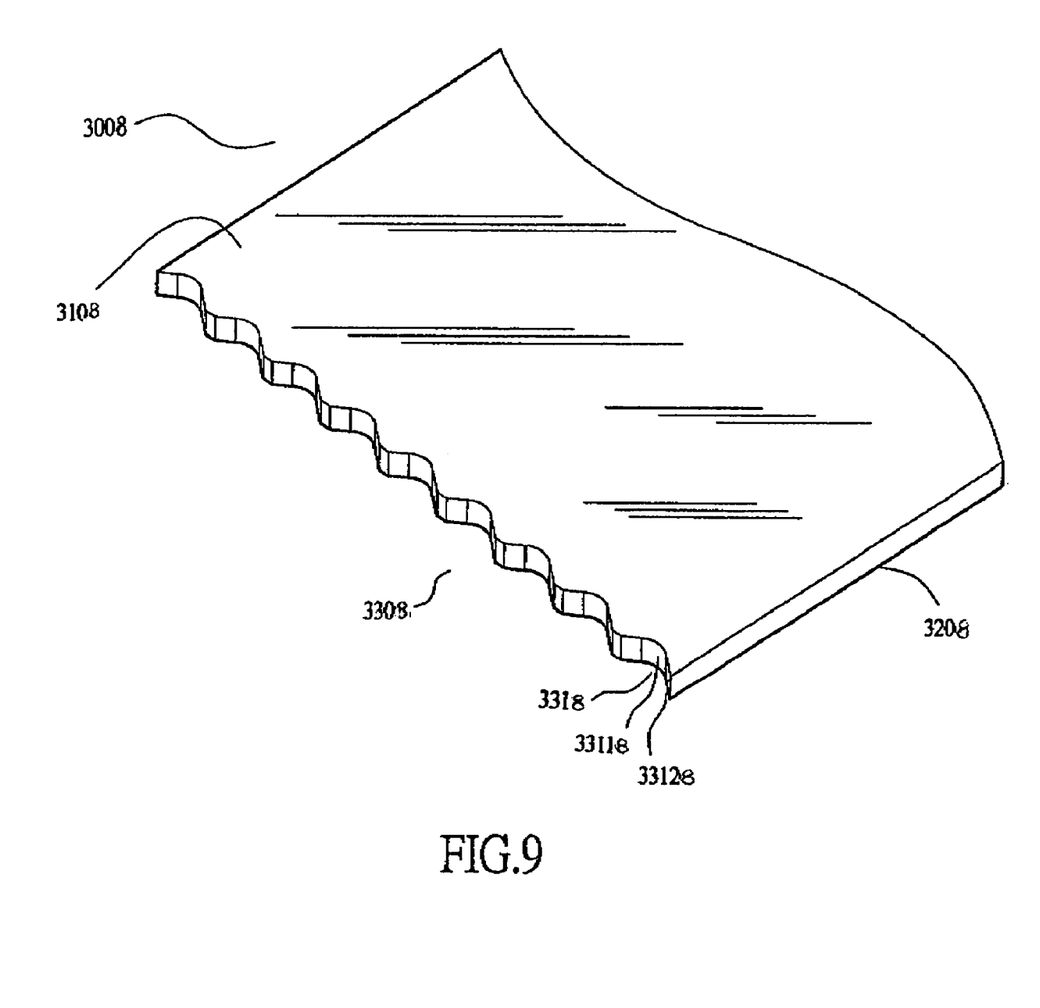
FIG. 9 is a perspective view of a light guide plate according to a third embodiment of the present invention.

As shown in FIG. 8. the light guide plate 3000 comprises a light exiting side 3100, a light entering side 3300 and a reflection side 3200. The light entering side 3300 is provided with a plurality of diffusing entities 3310 which budge outward therefrom. Each of the diffusing entities 3310 is formed with two slanting surfaces 33120 one at a side thereof. There is no gap between adjacent diffusing entities 3310. In addition to having the diffusing entities 331 to bulge outward from the light entering side 33, the diffusing entities 331 could be configured to concave inward into the light guide plate 3008 (see FIG 9). As shown in FIG. 9, the light guide plate 3008 comprises a light exiting side 3108, a light entering side 3308 and a reflection side 3208. The light entering side 3308 is provided with a plurality of diffusing entities 3318 each of which is formed with a concaved recess 3318 and two slanting surfaces 33128 one at a side thereof.

As shown in FIG. 9, there are small gaps between adjacent concaved diffusing entities 3318. Similar to FIG 8, the diffusing entities 3318 could be continuously arranged with no gaps left therebetween, as shown in FIG. 10, to further increase the scattering effect.

Figure 10:
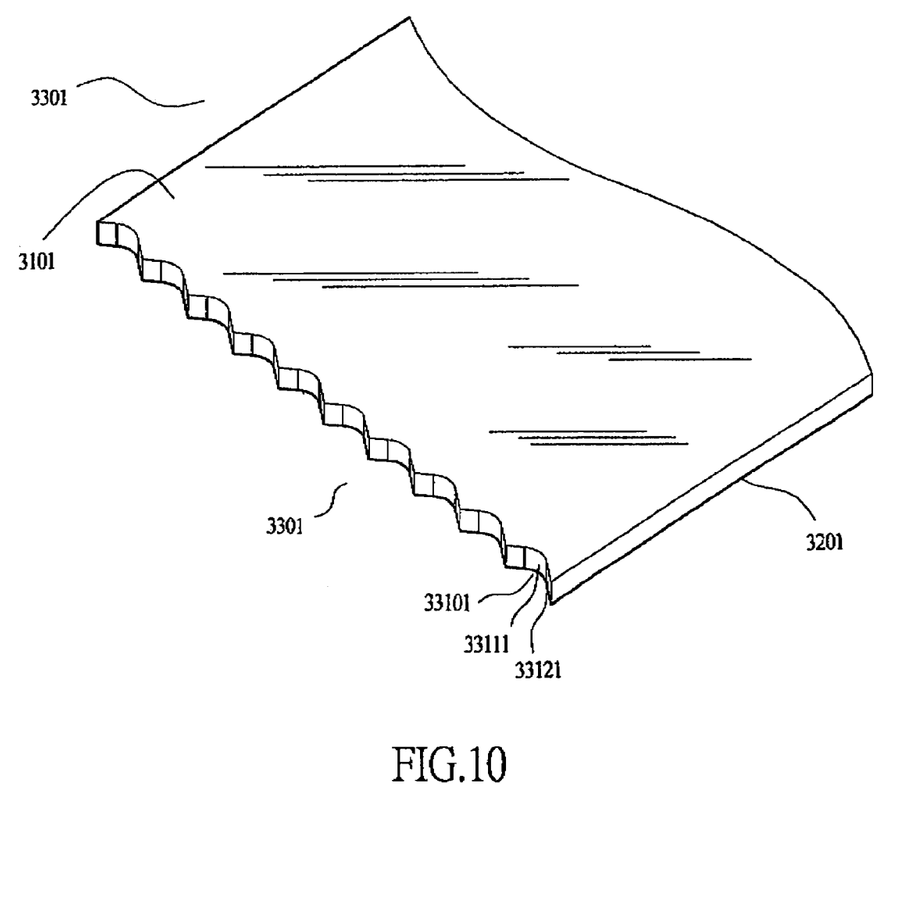
FIG. 10 is a perspective view of a light guide plate according to a fourth embodiment of the present invention.

As shown in FIG 10, the light guide plate 3301 comprises a light exiting side 3101, a light enterinaside 3301 and a reflection side 3201. The light entering side 3301 is provided with a plurality of diffusing entities 33101 each of which is formed with a concaved recess 33111 and two slanting surfaces 33121 one at a side thereof.

Figure 11:
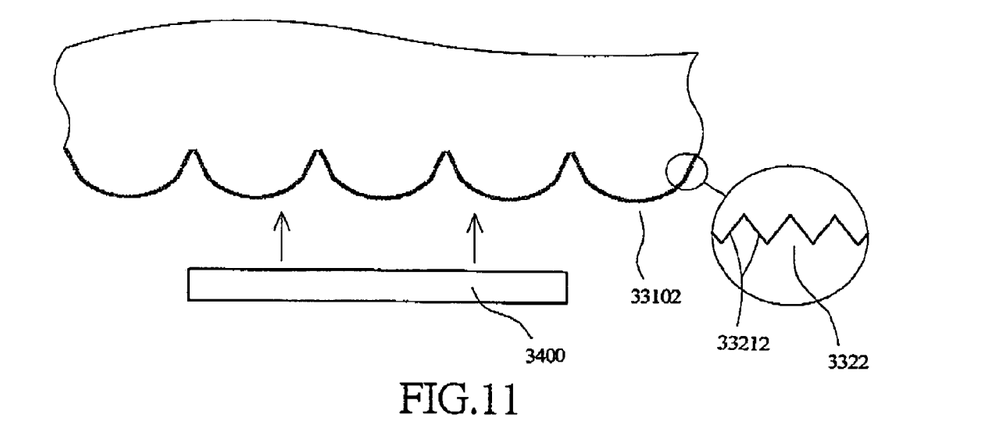
FIG. 11 is a schematic top view of a light guide plate according to a fifth embodiment of the present invention.
Figure 12:
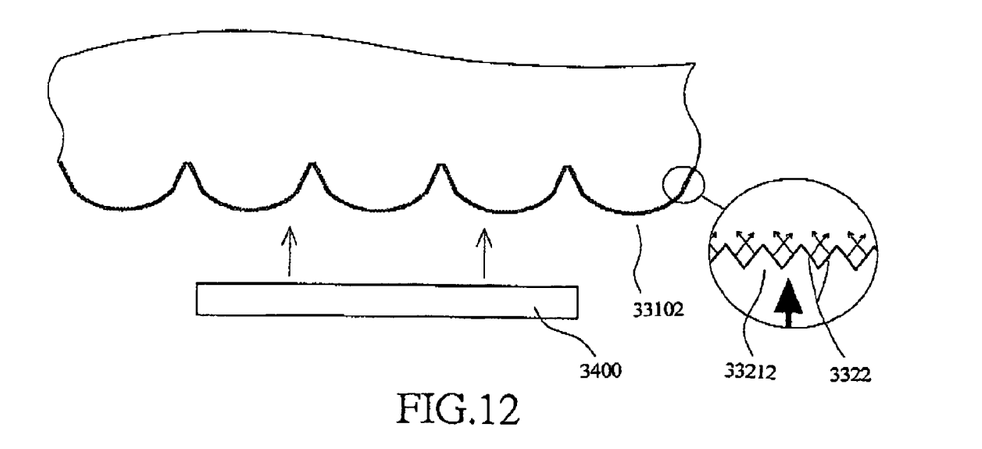
FIG. 12 is a schematic top view of the light guide plate depicted in FIG. 11 showing trajectories of lights.

The scattering effect of the previous embodiments could be further enhanced by forming multiple concaved, V-shaped diffusing grooves 3322 on the surface of the diffusing entities 33102, as shown in FIG 11. The diffusing grooves 3322 are aligned in parallel and extended from the reflection side to the light exiting side. When lights emitted from the LEDs 3400 pass through the light entering side, as shown in FIG 12, they are not only scattered by the diffusing entities 33102, but also further scattered by the slant surfaces 33212 inside the diffusing grooves 3322.

Figure 13:
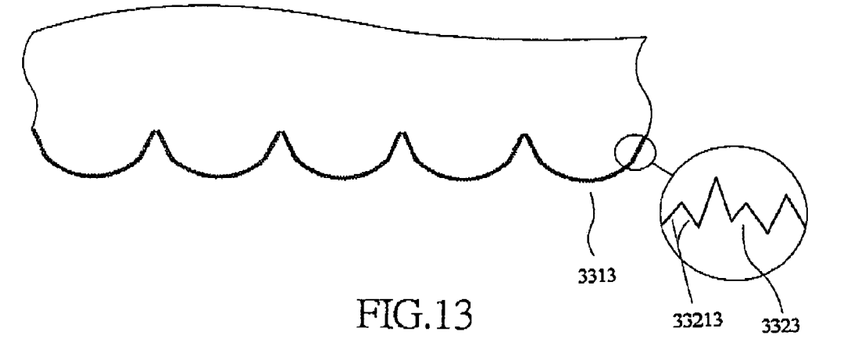
FIG. 13 is a schematic top view of a light guide plate according to a sixth embodiment of the present invention.

In another embodiment of the present invention, instead of having a regular V shape, the diffusing grooves 3323 of the diffusing entities 3313 could have an irregular V shape with two slanting surfaces 33213, as depicted in FIG. 13, which could still achieve the same scattering effect.

Figure 14:
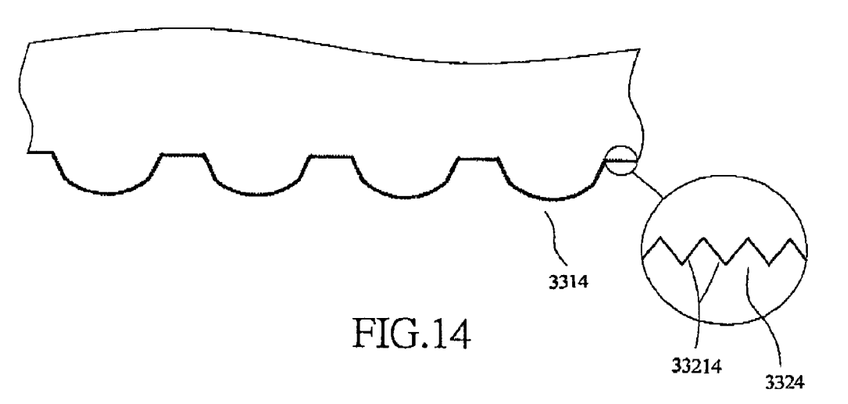
FIG. 14 is a schematic top view of a light guide plate according to a seventh embodiment of the present invention.

In the embodiment shown in FIG. 14 where there are gaps between adjacent diffusing entities 3314 on the light entering side, the gaps could also be configured to have diffusing grooves 3324 with two slanting surfaces 33214 on the surface. In this way, the lights emitted from the LEDs would all undergo the scattering effect of the diffusing grooves 3324.

Figure 15:
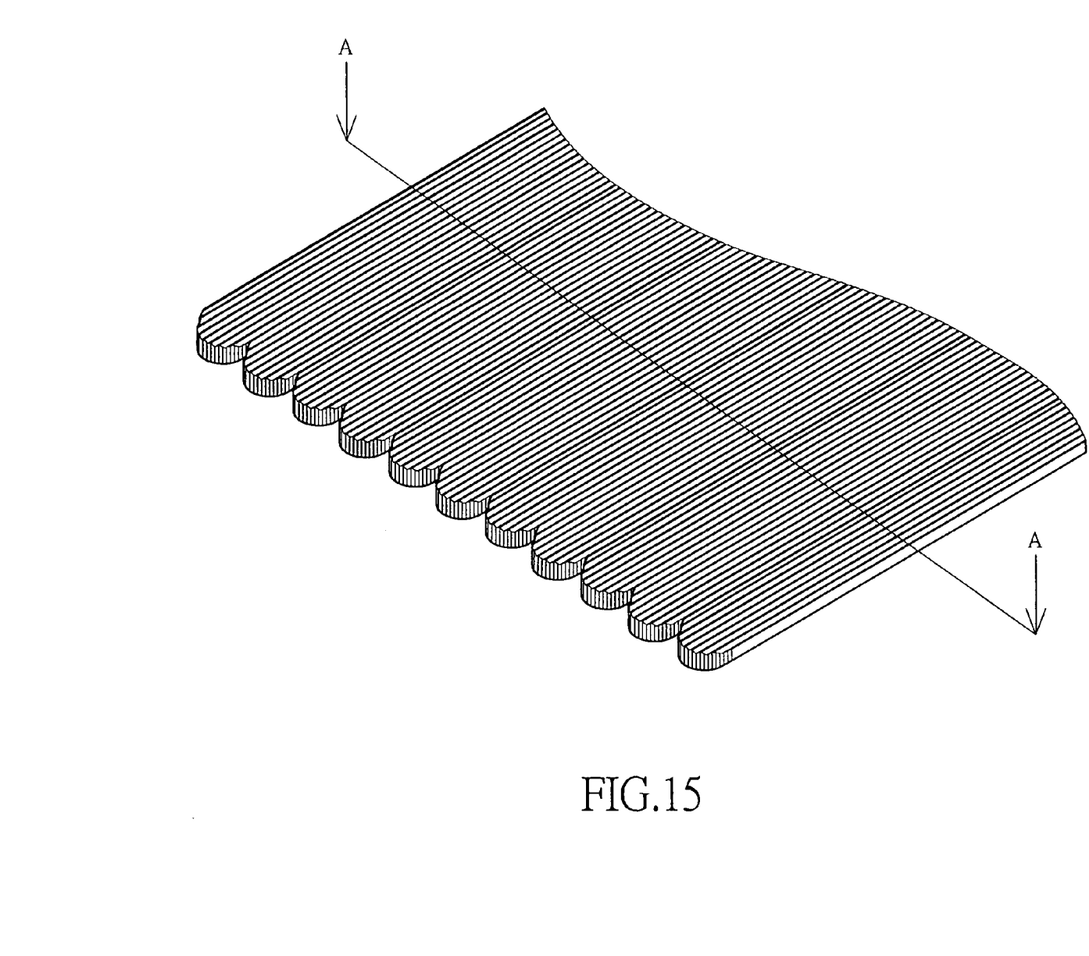
FIG. 15 is a perspective view of a light guide plate according to an eighth embodiment of the present invention.
Figure 16:
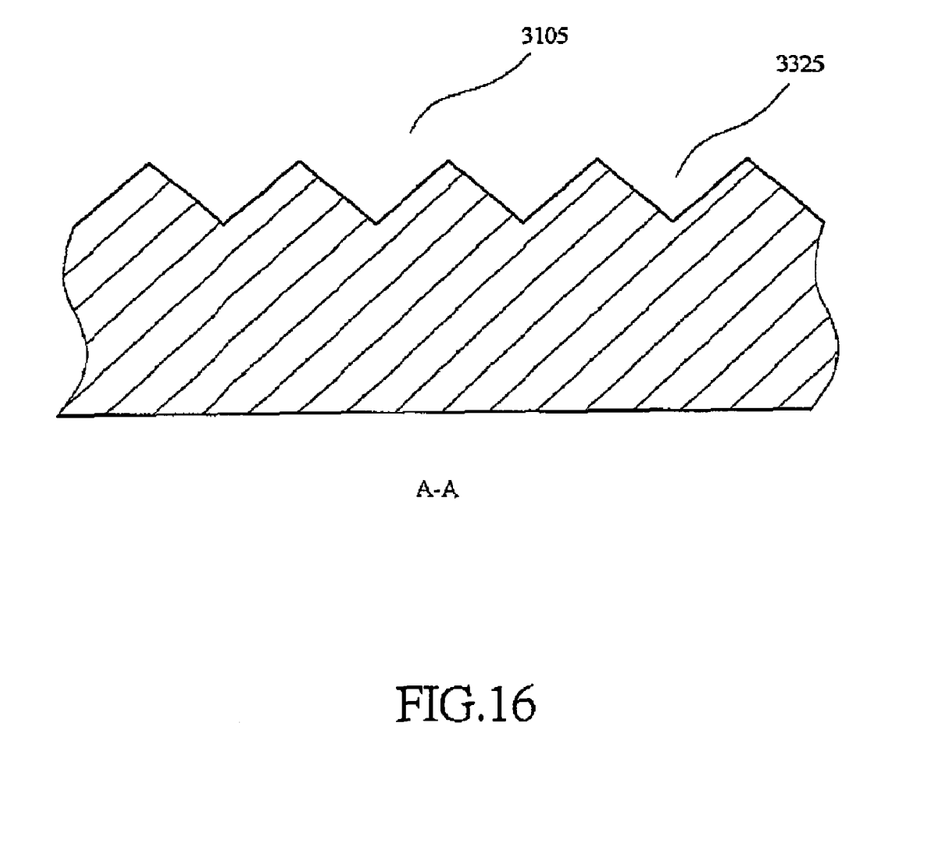
FIG. 16 is a cross-sectional view along the A-A line as depicted in FIG. 15.

Besides having diffusing grooves on the light entering side, the diffusing grooves could also be formed on the external surface of the light exiting side. In this way, the lights from the LED are not only scattered inside the light guide plate, but also further scattered when they leave the light guide plate through the light exiting side. As shown in FIG. 15, the diffusing grooves 3325 on the light exiting side 3105 are parallel and extending from the light entering side to an opposite side of the light guide plate. FIG 16 is a cross-sectional view along the A-A line as depicted in FIG 15. As shown in FIGS. 15 and 16, the diffusing grooves 3325 on the light exiting side 3105 are arranged with no gaps therebetween. In other embodiments, there could also be gaps between adjacent diffusing grooves 3325 on the light exiting side 3105.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A light guide plate for uniformly scattering light from point light source, comprising:
   a light exiting side for delivering said light to outside of said light guide plate;
   a reflection side opposite to said light exiting side for reflecting said light to change the course of traveling inside said light guide plate; and
   a light entering side at a flank of said light guide plate, for receiving light from said light source;
   wherein said light entering side is provided with a plurality of diffusing entities which bulge outward from said light entering side, each of said diffusing entities having two sides each formed with a slanting surface, each of said diffusing entities having a plurality of first diffusing grooves on a surface of said diffusing entities, said first diffusing grooves being in parallel and extending from said reflection side to said light exiting side, said diffusing grooves being V-shaped; second diffusing grooves being formed on an external surface of said light exiting side and being parallel and extending from said light entering side to an opposite side of said light guide plate.

2. The light guide plate for uniformly scattering light from point light source as claimed in claim 1, wherein said first diffusion grooves are arranged to include gaps therebetween.

3. The light guide plate for uniformly scattering light from point light source as claimed in claim 1, wherein said second diffusion grooves are V-shaped.

* * * * *